(12) United States Patent
Lu

(10) Patent No.: US 11,036,478 B2
(45) Date of Patent: Jun. 15, 2021

(54) AUTOMATED DETERMINATION OF TRANSFORMATION OBJECTS

(71) Applicant: SAP SE, Walldorf (DE)

(72) Inventor: Weihao Lu, Mannheim (DE)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/534,353

(22) Filed: Aug. 7, 2019

(65) Prior Publication Data
US 2021/0042097 A1 Feb. 11, 2021

(51) Int. Cl.
*G06F 8/41* (2018.01)
*G06F 11/36* (2006.01)

(52) U.S. Cl.
CPC ............ *G06F 8/41* (2013.01); *G06F 11/3684* (2013.01); *G06F 11/3688* (2013.01)

(58) Field of Classification Search
CPC ..... G06F 8/41; G06F 11/3684; G06F 11/3688
See application file for complete search history.

(56) References Cited

U.S. PATENT DOCUMENTS

| | | | | |
|---|---|---|---|---|
| 9,400,639 B2* | 7/2016 | Kalai | ...................... | G06N 20/00 |
| 10,635,414 B2* | 4/2020 | Gulwani | .................... | G06F 8/30 |
| 2002/0062475 A1* | 5/2002 | Iborra | ................. | G06F 16/2365 |
| | | | | 717/108 |
| 2008/0282108 A1* | 11/2008 | Jojic | ........................ | G06F 8/436 |
| | | | | 714/26 |
| 2011/0302553 A1* | 12/2011 | Gulwani | ................... | G06F 9/44 |
| | | | | 717/107 |
| 2012/0198322 A1* | 8/2012 | Gulwani | ................. | G06F 40/18 |
| | | | | 715/217 |
| 2013/0326475 A1* | 12/2013 | Gulwani | ................. | G06F 40/12 |
| | | | | 717/107 |
| 2013/0346982 A1* | 12/2013 | Kalai | ..................... | G06N 5/025 |
| | | | | 718/100 |
| 2014/0101643 A1* | 4/2014 | Inoue | ..................... | G06F 8/443 |
| | | | | 717/156 |
| 2017/0249126 A1* | 8/2017 | Manevich | ........... | G06F 11/3664 |
| 2018/0113848 A1* | 4/2018 | Gulwani | .............. | G06F 40/103 |
| 2018/0275967 A1* | 9/2018 | Mohamed | ............... | G06N 3/08 |

(Continued)

OTHER PUBLICATIONS

"Everything You Need to Know About Flash Fill in Microsoft Excel [15 Examples]," retrieved from https://www.howtoexcel.org/tutorials/flash-fill/, published Jun. 24, 2019, 18 pages.

(Continued)

*Primary Examiner* — Douglas M Slachta
(74) *Attorney, Agent, or Firm* — Klarquist Sparkman, LLP

(57) ABSTRACT

Technologies are described for creating transformation objects, where a transformation object can make selected changes to a given input that includes a plurality of characters. At least one input example and at least one output example are provided, each including a set of a plurality of sequenced characters. A transformation function discovery process is initiated that accesses a rule base of intermediate functions to develop a transformation function as a set of intermediate functions that convert the input example to the output example. A transformation object is generated that allows access to the transformation function. References to the transformation object can be included in source code and used to convert the given input to an output.

20 Claims, 14 Drawing Sheets

(56) References Cited

U.S. PATENT DOCUMENTS

| | | | | |
|---|---|---|---|---|
| 2019/0042210 A1* | 2/2019 | Gaunt | ................... | G06N 3/0445 |
| 2019/0171422 A1* | 6/2019 | Udupa | ....................... | G06F 8/36 |
| 2019/0212989 A1* | 7/2019 | Polozov | ............... | G06N 3/0445 |
| 2019/0324730 A1* | 10/2019 | Gulwani | .................... | G06F 8/30 |
| 2020/0012741 A1* | 1/2020 | Bracholdt | ............. | G06F 16/212 |

OTHER PUBLICATIONS

"How to access the SAP predictive functions?" Nextview, retrieved from https://www.nextview.nl/predictive-analytics-on-sap-hana/, published Jan. 12, 2016, 7 pages.

"Inductive programming," Wikipedia, https://en.wikipedia.org/wiki/Inductive_programming, retrieved on or before Aug. 5, 2019, 9 pages.

"Reinforcement Learning—Comparison of reinforcement learning algorithms," Wikipedia, retrieved from https://en.wikipedia.org/wiki/Reinforcement_learning#Comparison_of_reinforcement_learning_algorithms, retrieved on or before Aug. 5, 2019, 16 pages.

"Using Flash Fill in Excel," MS Office Support, retrieved from https://support.office.com/en-us/article/using-flash-fill-in-excel-3f9bcfle-db93-4890-94a0-1578341f73f7 on or before Aug. 5, 2019, 4 pages.

Cheusheva, "How to use Flash Fill in Excel 2019, 2016 and 2013," Ablebits.com, retrieved from https://support.office.com/en-us/article/using-flash-fill-in-excel-3f9bcfle-db93-4890-94a0-1578341f73f7, published Apr. 16, 2019, 18 pages.

* cited by examiner

```
globalInputExample                                              300
result = ""

writeFirstWord(){                                          ⎫
//split the string into words (non-alphanumeric chars are the seperator)  ⎬ 308a
wordsArray = globalInputExample.split(/[^A-Za-z0-9_]/g)    ⎪
result += wordsArray[0]                                    ⎭
} writeSecondWord(){                                         ⎫
//split the string into words (non-alphanumeric chars are the seperator)  ⎬ 308b
wordsArray = globalInputExample.split(/[^A-Za-z0-9_]/g)    ⎪
result += wordsArray[1]                                    ⎭
} writeThirdWord(){                                          ⎫
//split the string into words (non-alphanumeric chars are the seperator)  ⎬ 308c
wordsArray = globalInputExample.split(/[^A-Za-z0-9_]/g)    ⎪
result += wordsArray[2]                                    ⎭
}
writeSpace(){   312
result += " ";
}
                              316a
upperCaseFirstChar(){
result[0] = result[0].toUpperCase()
}                             316b
upperCaseSecondChar(){
result[1] = result[1].toUpperCase()
}                             316c
upperCaseThirdChar(){
result[2] = result[2].toUpperCase()
                              316d
upperCaseFourthChar(){
result[3] = result[3].toUpperCase()
}
```

FIG. 3

```
import { IO } from "./types";
import { DynamicKnowledgeBase, hp } from "./DynamicKnowledgeBase";
const MAX_FIND_WRITE_CLAUSE_ITERATIONS = 100;                              408
export const MAX_GAIN = 100000;                       412
                                414
export function searchAlgorithm(examples: { positive: IO[], negtive: IO[] }, kb:
DynamicKnowledgeBase): string {
    if (!(examples.positive.length > 0)) {
        return "";
    }
    const mainFunction = kb.getMainFunction();                     400
    let functionComposition = "";
    let allOutputsMatched = false;
    let counter = 0;
    const backgroundKnowledge = kb.getFunctionNames();
    let bestGain: number = 0;
    let bestIndex: number = -1;
    let currentGain: number;
    let tempH = "";
    const P = examples.positive;
    const evalKb = kb.getKnowledgeBase();
    let improvementFound: boolean;

for (const p of P) {
        bestGain += scoreOf(p.input, p.output);
    }
    bestGain = bestGain / P.length;

improvementFound = true;
    while (improvementFound && !allOutputsMatched && counter < MAX_FIND_WRITE_CLAUSE_ITERATIONS
&& bestGain < Number.MAX_SAFE_INTEGER) {
        improvementFound = false;
        backgroundKnowledge.functions.forEach((func: string, index: number) => {
            tempH = `${functionComposition}${func}();`;
            currentGain = 0;
            allOutputsMatched = true;
            for (const p of P) {
                currentGain += scoreOf(eval(mainFunction.replace(hp, evalKb.join("") + tempH) +
kb.callMain(`"${p.input}"`)), p.output);
                if (currentGain < MAX_GAIN) {
                    allOutputsMatched = false;
                }
            }
            if (currentGain / P.length > bestGain) {
                bestGain = currentGain / P.length;
                bestIndex = index;
                improvementFound = true;
            }
        });

if (improvementFound) {
            counter++;
            functionComposition =
`${functionComposition}${backgroundKnowledge.writeFunctions[bestIndex]}();`;
        }
    }
    return functionComposition;
}                                                                        422 function scoreOf(functionCompositionOutput: string, exampleOutput: string) {
    const match = exampleOutput.toLowerCase().substring(0, functionCompositionOutput.length) ===
functionCompositionOutput.toLowerCase();
    if (match) {
        const lengthDiff = Math.abs(functionCompositionOutput.length -
functionCompositionOutput.length);
        return (lengthDiff > 0) ? (exampleOutput.length / lengthDiff) : Number.MAX_SAFE_INTEGER;
    }
    else {
        return -100;
    }
}
```

FIG. 4

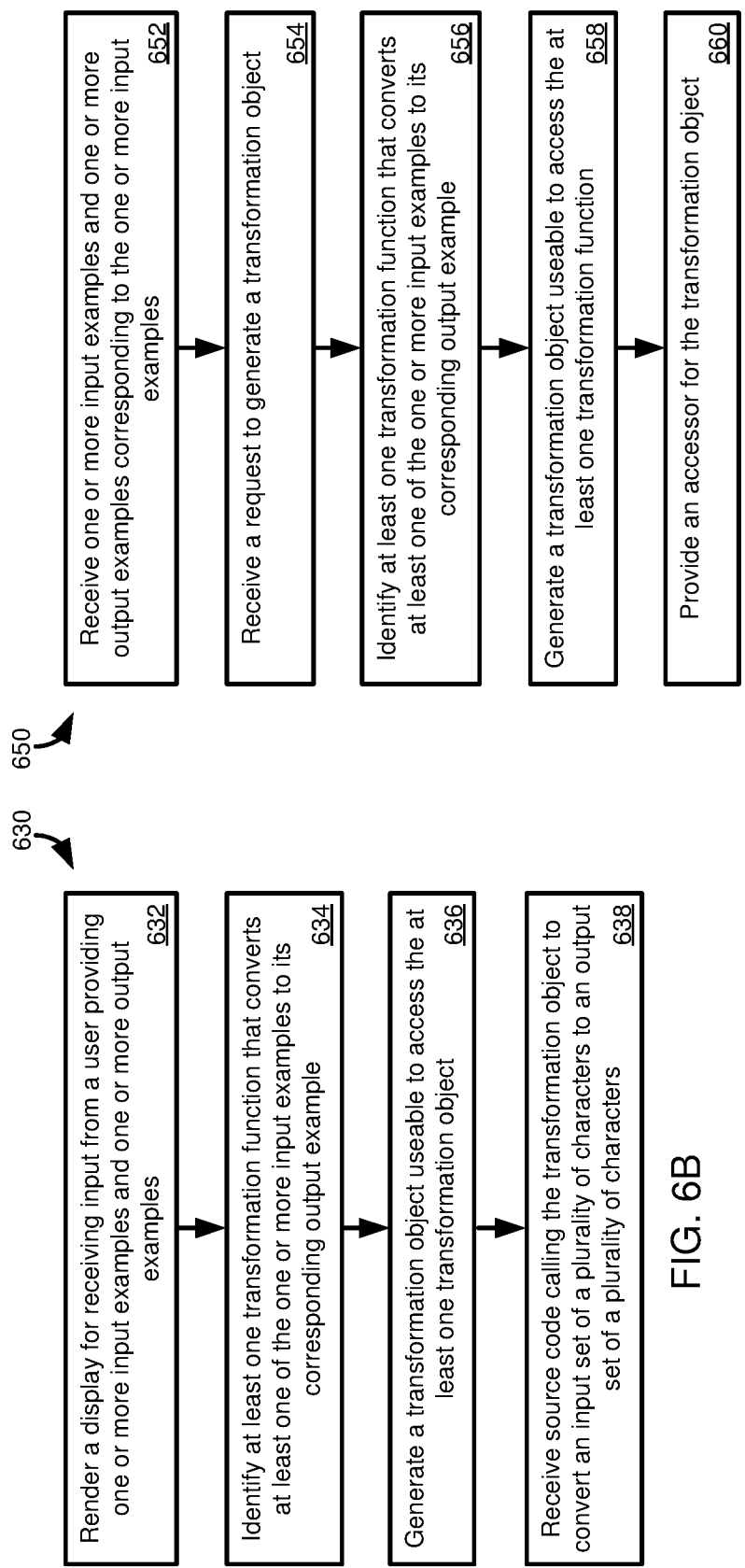

AUTOMATED DETERMINATION OF TRANSFORMATION OBJECTS

FIELD

The present disclosure generally relates to creating software data objects useable to convert an input set of characters to a particular format. Particular implementations relate to determining transformation functions useable for such data objects using one or more input/output examples and a rule base that includes a plurality of intermediate functions.

BACKGROUND

Many computer implemented processes involve processing collections of characters, or strings. The characters can come from various sources, such as user input, or stored data, such as data stored in a relational database system. A particular format in which characters may be provided may have been intended for a first purpose, but may make the characters more difficult to use for other purposes. In some cases, characters may have been provided without any kind of predefined format for any particular use, which can complicate efforts to use them.

When a program is being developed that involves processing characters, typically, a programmer will need to develop code to manipulate characters into a format desired for a particular use. Developing code for text processing, and similar functions, can be tedious, time consuming, and prone to errors. For example, a programmer may develop code in a way that handles some use cases, but does not provide a rule that is sufficient to handle all possible inputs. Errors can arise, even after software is released, if input is provided and code to transfer the input is not correctly implemented. These errors can result in program errors (e.g., bugs or crashes), incorrect data, and possibly even security concerns. Software development can be more time consuming if input required for other processes is not correctly handled, but the cause of the error may be difficult to debug and correct. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for creating transformation objects, where a transformation object can make selected changes to a given input that includes a plurality of characters. At least one input example and at least one output example are provided, each including a set of a plurality of sequenced characters. A transformation function discovery process is initiated that accesses a rule base of intermediate functions to develop a transformation function as a set of intermediate functions that convert the input example to the output example. A transformation object is generated that allows access to the transformation function. References to the transformation object can be included in source code and used to convert the given input to an output.

In one aspect, a method is provided for generating transformation objects. At least a first input example is received. The at least a first input example includes a first set of a first plurality of sequential characters. At least a first output example is received. The at least a first output example corresponds to the at least a first input example and includes a second set of a second plurality of sequential characters. A processing input is set to the first input example.

A transformation function discovery process is initiated. At least one intermediate function is applied to the processing input to provide an intermediate result. The intermediate result is compared with the first output example. It is determined that the intermediate result matches the output example, in which case a current path of intermediate functions is returned for use in creating a transformation object. Or, it is determined that the intermediate result does not match the output example, in which case it is determined that the transformation function discovery process should continue.

A transformation function is received. The transformation function includes a composition of sequenced intermediate functions. A transformation object is generated. In some cases, the generating can occur prior to, or currently with, receiving a transformation function, while in other cases the generating can occur after the receiving. The transformation function is stored in the transformation object (e.g., code implementing the transformation function is stored, or references to code that can be used to carry out transformation operations are stored). The transformation object is referenceable by computing code to process at least one input provided by the computing code to provide a transformed output in response.

According to another aspect, another method is provided for generating transformation objects. A display is rendered for receiving user input from a user. The user input provides one or more input examples and one or more output examples corresponding to the one or more input examples. The one or more input examples and the one or more output examples include respective sets of a plurality of characters.

At least one transformation function is identified that converts at least one of the one or more input examples into its corresponding output example. A transformation object (e.g., a function, such as in a file, or an instance of a class) is generated that is useable to access the at least one transformation function. Source code is received that calls the transformation object to convert an input set of a plurality of characters to an output set of a plurality of characters.

In a further aspect, a further method is provided for generating transformation objects. One or more input examples and one or more output examples, corresponding to the one or more input examples, are received. The one or more input examples and the one or more output examples include respective sets of a plurality of sequenced characters.

A request is received to generate a transformation object. At least one transformation function is identified that converts at least one of the one or more input examples to its corresponding output example. The at least one transformation function includes or calls a plurality of intermediate functions. A transformation object useable to access the at least one transformation function is generated. An accessor for the transformation object is provided.

The present disclosure also includes computing systems and tangible computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 3 is pseudocode for an example rule base that can be used in determining transformation functions.

FIG. 4 is TypeScript code for a program that implements an example transformation function search engine.

FIGS. 6A-6C are flowcharts illustrating embodiments of disclosed methods for creating transformation objects.

DETAILED DESCRIPTION

Example 1—Overview

Figure 1:
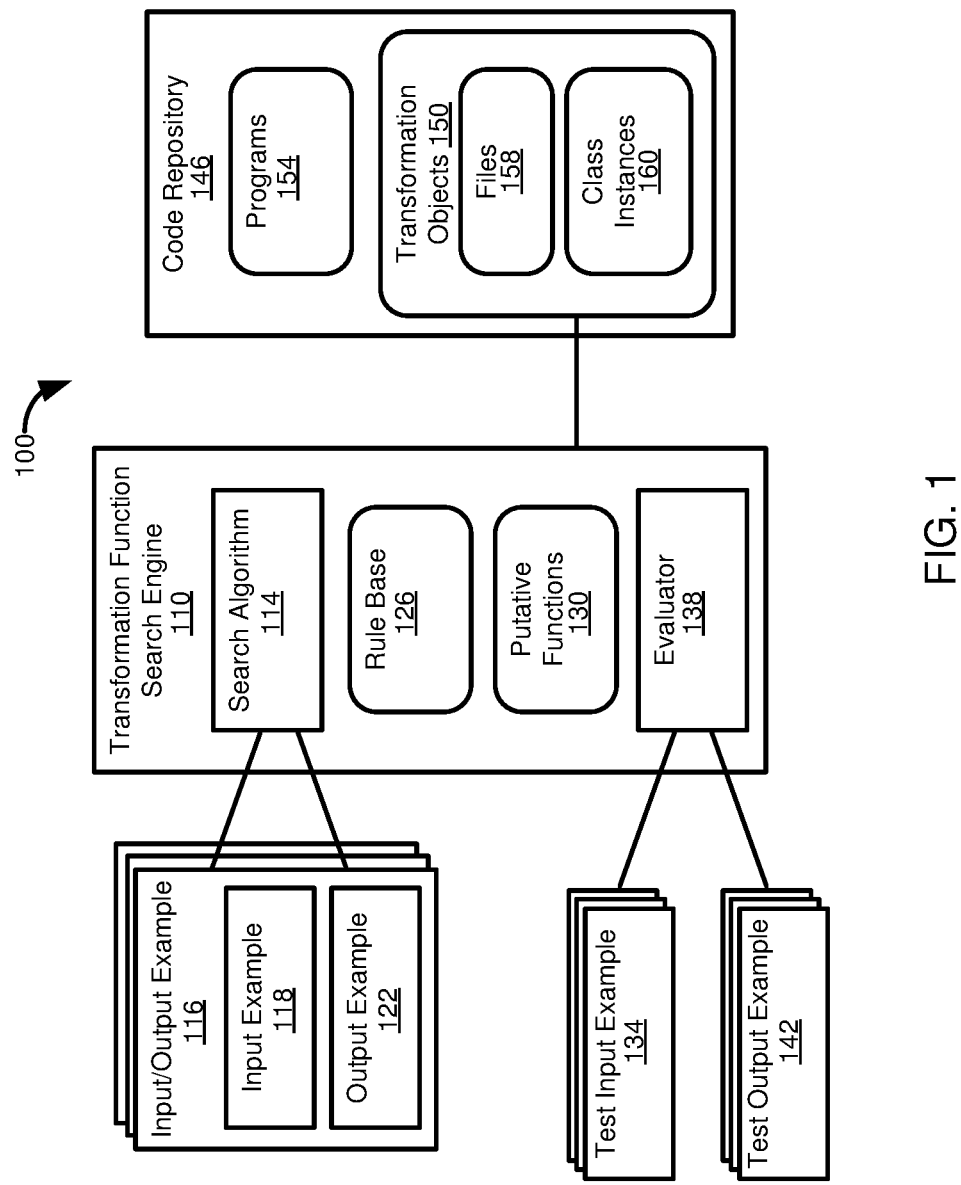
FIG. 1 is a diagram schematically illustrating how a transformation function search engine can process input and output examples to provide transformation functions and transformation objects useable to access such transformation functions.

Many computer implemented processes involve processing collections of characters, or strings. The characters can come from various sources, such as user input, or stored data, such as data stored in a relational database system. A particular format in which characters may be provided may have been intended for a first purpose, but may make the characters more difficult to use for other purposes. In some cases, characters may have been provided without any kind of predefined format for any particular use, which can complicate efforts to use them.

When a program is being developed that involves processing characters, typically, a programmer will need to develop code to manipulate characters into a format desired for a particular use. Developing code for text processing, and similar functions, can be tedious, time consuming, and prone to errors. For example, a programmer may develop code in a way that handles some use cases, but does not provide a rule that is sufficient to handle all possible inputs. Errors can arise, even after software is released, if input is provided and code to transfer the input is not correctly implemented. These errors can result in program errors (e.g., bugs or crashes), incorrect data, and possibly even security concerns. Software development can be more time consuming if input required for other processes is not correctly handled, but the cause of the error may be difficult to debug and correct. Accordingly, room for improvement exists.

Disclosed technologies provide for defining programmatic functions, which can be referred to as transformation functions, for arbitrary modifications to a collection of characters, such as a string (which can be implemented in various manners, such as using a string class, or using a character array, such as C-style or null-terminated strings). Programmatic functions can generally be a collection of one or more routines, formed from one or more lines of codes. A routine can be, for example: a function of a larger program; a method of an abstract data type; an API method; or a script that causes other computer functionality to be called, including calling a series of functions that accomplish a desired transformation for an input collection of characters.

A programmatic function produced using disclosed technologies can be accessed by other programs. For example, the programmatic function can be added to a library or repository, where the programmatic function can be called by programs with access to the library or repository. The program can be in a transformation object, such as a file or a instance of a class, which can be called by other code in order to execute, or cause to be execute, the transformation function associated with the transformation object.

Programmatic functions produced according to disclosed technologies can be capable of producing an output that complies with a desired transformation for at least portion of arbitrary inputs, in some cases all arbitrary inputs, at least where an arbitrary input complies with an expected format. In one example, a transformation function can be identified that extracts first and last names from email addresses. A user may know, for example, that expected input will at least generally be of the form "firstname.lastname@domain," and that the desired output example is the assignment of "Firstname," with the first letter capitalized, to a "FirstName" variable and the assignment of "LastName," with the first letter capitalized, to a "LastName" variable. While the user may or may not have the technical knowledge to write their own transformation function, even if they do, it can be time consuming, tedious, and error prone for the user to manually code a transformation function.

In this example, a transformation function can be automatically identified that separates the input string using the period, discards the "@" symbol and everything thereafter, capitalizes the first character of each character subset, and assigns the first character subset to "FirstName" and assigns the last character subset to "LastName." Other examples of transformations that can be useful, and for which the disclosed technologies can be used to find transformation functions, and encapsulate such functions in transformation objects that can be called to provide a transformation for an arbitrary input include (where variables to which portions of the input string may be assigned are underlined):

Sia in Frankfurt for 100€→Artist: Sia, Town: Frankfurt, Price: 100€

09.12.2001→12.09.01

UpPerCaseAL1→UPPERCASEALL

[To] [Technical] [Format]→To Technical Format

Cut Off the start and the end→Off the start and the

A transformation function can be determined by analyzing one or more examples of a desired transformation. For instance, at least one input and an expected or desired output to be produced from the at least one input can be provided as a training example. In particular, inductive programming techniques can be used to determine at least one transformation function that accomplishes the transformation. In the event that multiple transformation functions are identified, a set of multiple transformation functions can be returned, or the set can be reduced, including to a single member, by applying one or more rules. For example, when multiple transformation functions are available, a transformation function can be selected that has the shortest processing time, uses the least amount of memory, calls the fewest number of intermediate functions (as will be further described), other features, or combinations of these features.

In further implementations, a set that includes multiple input and output examples can be provided. In some cases, a transformation function can be determined to have been found if it is capable of correctly transforming a threshold amount of input examples, which can be all input examples. In the case where multiple transformation functions are identified, reducing a set of candidate transformation functions can include selecting one or more transformation functions that correctly transform larger proportions of input examples.

Inductive programming techniques can be implemented in a variety of programming languages. In some cases, these programming languages can be more general purpose programming languages, such as C++ or TypeScript. In other cases, the programming languages can be programming language that have found particular use in inductive programming, including Lisp, Prolog, and Haskell, including dialects of these languages (e.g., for Lisp, the Scheme dialect can be used). Generally, inductive programming techniques can include inductive logic programming, description logs, constraint programming, or probabilistic programming.

In a particular implementation, which will be further described, a rule base can be provided, where the rule base provides a plurality of intermediate functions. These intermediate functions can be functions that accomplish elements of typical transformations for sets of characters. Intermediate functions can include functions such as:

Change capitalization of first element of set
Change capitalization of last element of set
Change capitalization of a specified element of set
Remove first element of set
Remove last element of set
Remove a specified element of set
Extract one or more sub-sets of set (e.g., a substring function)
Tokenize set (e.g., based on a specified delimiter)
Analyze set for potential delimiter (e.g., "@" ";" "," ".")

In at least some cases, intermediate functions, or processes for selecting intermediate functions to be used, are not conditional. That is, for example, the transformation function can be defined without using a rule or intermediate function of the type "If first character='r' then remove first character".

In an example using a rule base as described above, determining a transformation function can be a recursive/backtracking procedure. For example, if a transformation function cannot be identified for a particular combination of intermediate functions under consideration (e.g., in a path—a particular sequence of particular intermediate functions), or cannot be identified given particular parameters, one or more intermediate functions in the set being evaluated can be removed and alternative combinations of additional intermediate functions evaluated. Parameters provided for a search process to find a transformation function can include a maximum number of intermediate functions, a maximum number iterations, or a maximum running time. In a particular example, a transformation function can be a series of call to intermediate functions that successfully reproduce the test output from the test input. The transformation function can thus be an algorithm defining an order that intermediate functions should be called, and, in at least some cases, what input should be provided to the intermediate function and how the output of the intermediate function should be further processed.

Disclosed technologies can provide various advantages. As has been described, disclosed technologies can automatically create programmatic functions that can be used in conjunction with other computer processes, including being called by other computer code. Rather than having to manually develop code to accomplish a particular transformation, a user, such as a software developer or programmer (although in other cases the use of an identified transformation function can be automated) can simply provide one (or more) input and output examples. This automation can be particularly useful, as the search space for transformation grows significantly as the number of intermediate functions increases. Thus, software development processes can be expedited, resource (e.g., developer time) use reduced, and code developed that may be subject to fewer errors, which can also reduce security concerns.

In addition, transformation objects can allow for flexible use of transformation functions in a variety of different contexts. For example, arbitrary code, such as for user interface elements, can reference a transformation object in order to use functionality of transformation functions. That is, transformation objects allow transformation functions to be used flexibly to improve programs being developed, rather than being fixed in a preexisting program or use case.

Example 2—Example Computing Environment Including Transformation Function Search Engine FIG. 1 illustrates a computing environment 100 that includes a transformation function search engine 110. The transformation function search engine 110 includes a search algorithm 114. The search algorithm 114 can be a search algorithm that uses inductive programming techniques, such as those described in Example 1, to identify a transformation function to accomplish a desired transformation of a set of a plurality of characters. In at least some implementations, the search algorithm 114 is configured to process sets of input/output tuples 116, where a tuple includes an input example 118 and an output example 122. The output example 122 represents the result that should be achieved for a particular input example 118.

In some cases, additional information can be provided to the transformation function search engine 110. For instance, for a given input example 118, one or more intermediate result examples (not shown in FIG. 1) can be provided, where an intermediate result can help guide the search algorithm 114 toward the desired output 122, which can help the search algorithm determine intermediate processing steps that may be needed.

As an example, consider an input example 118 in the form of an email address, such as Weihao.Lu@inventor.org. It may be desired to extract first and last name information from the email address. An example output 122 of firstName=Weihao, lastName=Lu can be provided, and the search algorithm 114 can be used to develop a transformation function to accomplish this result. An intermediate result might be Weihao.Lu, which can indicate that this portion of the email address is of interest, and should be extracted from the input example 118. While an intermediate result might not be particularly needed in this email example, it can be more helpful for more complicated transformations, including when there may be less consistency between input examples 118, or input that may be used with a transformation function provided by the transformation search engine 110.

As an example, where multiple input examples 118, and optionally intermediate result examples, can be helpful, consider the email scenario where an email address can have multiple periods before the domain portion of the email address, such as Weihao.AwesomeInventor.Lu@inventor.com. The same output example 122 as before may be used with this additional input example 118, which can help the search algorithm recognize that the first and last substrings prior to the domain name are of interest, and should correspond to lastName and firstName, and providing Weihao.Awesome- Inventor.Lu as an intermediate result can help the search algorithm recognize that the domain portion of the email address (@inventor.com) can be discarded.

In carrying out its functions, the search algorithm 114 can access a rule base 126. The rule base 126 can include intermediate functions that can, for example, be used to incrementally convert a given input to an output. As described in Example 1, at least some of the intermediate functions in the rule base 126 can be narrowly tailored to carry out a particular manipulation of an input, such as extracting a subset of characters (where all of the resulting subsets can be further processed, or at least one of such subsets can be discarded), changing the capitalization at a particular position, removing one or more characters at a particular location, or adding one or more characters at a particular location (which can be an insert operation, in some cases, or a concatenation operation).

However, in at least some examples, intermediate functions in the rule base 126 can produce more complex transformations, where typically the same transformation could be accomplished by sequential application of multiple more narrowly-tailored rules. Providing more complex rules can be useful, as it can, for example, simplify the resulting transformation function, possibly improving the execution speed of the transformation function, or expediting the process of finding a suitable transformation function. In some embodiments, when a transformation function is identified by the search algorithm 114, that transformation function can be added to the rule base 126. However, in other embodiments, transformation functions identified by the search algorithm are not added to the rule base 126, or at least are not automatically added.

In at least some cases, transformation functions identified by the search algorithm 114 are treated as putative transformation functions 130. That is, while a result of the search algorithm 114 may have correctly reproduced one or more output example 122 for one or more corresponding input examples 118, it may be desirable to test the result again additional input examples, test input examples 134, prior to concluding that the result can be used as a transformation function.

Testing of putative transformation functions 130 can be carried out by an evaluator 138. The evaluator 138 can call a putative function 130 with a given test input example 134 and determine the output. In some cases, the output can be compared with a test output example 142 that was provided for a given test input example 134. In these cases, the evaluator 138 can determine whether the output of the putative function 130 matches the test output example 142, or can determine a degree of matching between them. In other cases, the output determined by the evaluator 138 can be provided, such as to a user, for a determination to be made as to whether the output of the putative function 130 matches, or sufficiently matches, a test output example 142 or is otherwise sufficient for use (e.g., a user can determine by inspection whether the output is appropriate).

Putative transformation functions 130, or optionally those putative transformation functions that were satisfactorily evaluated by the evaluator 138, can be stored as transformation objects 150 in a code repository 146. The transformation objects 150 can be persisted representations that can be called for execution by, or compiled for execution with, one or more programs 154 stored in the code repository 146 (or, optionally, a different repository). For example, the transformation objects 150 can act as elements of a library, which can be included in a program 154 when the program is compiled, or called and linked with the program when needed (e.g., the program tries to call the transformation object). The transformation objects 150 can be implemented, in some cases, as files 158 or as instances 160 of a class. In other cases, code or other instructions corresponding to a transformation object 150 (or a transformation function of a transformation object) can be incorporated into a program 154.

The code repository 146 can include additional information, such as classes (or instances of classes) 158. In some cases, one or more transformation objects 150 can be instances of a class 158 and can be called by the programs 154. For example, the classes 158 can act as an API through which a program 154 may access functionality of a transformation object 150. In a particular implementation, a transformation object 150 can include code from, or calls to, intermediate functions, which can be stored in the code repository 146 or in the rule base 126.

Note that, in some cases, separate transformation objects 150 can be generated for each transformation function 130. In other cases, a transformation object 150 can include multiple transformation functions. For example, a single transformation object 150 can be used in association with a particular program or program element, such as a user interface screen. Any transformation functions 130 can be included in the transformation object for that program or program element. If a transformation function 130 is found, and no transformation object 150 yet exists, the transformation object can be created and the transformation function stored therein. If a transformation function 130 is found, and a transformation object 150 already exists, such as because transformation objects are generated independently of, or prior to, transformation function identification, or because other transformation functions have already been identified for a particular program or program element, the transformation function can be added to the existing transformation object.

Example 3—Example Method for Creating Transformation Objects

Figure 2:
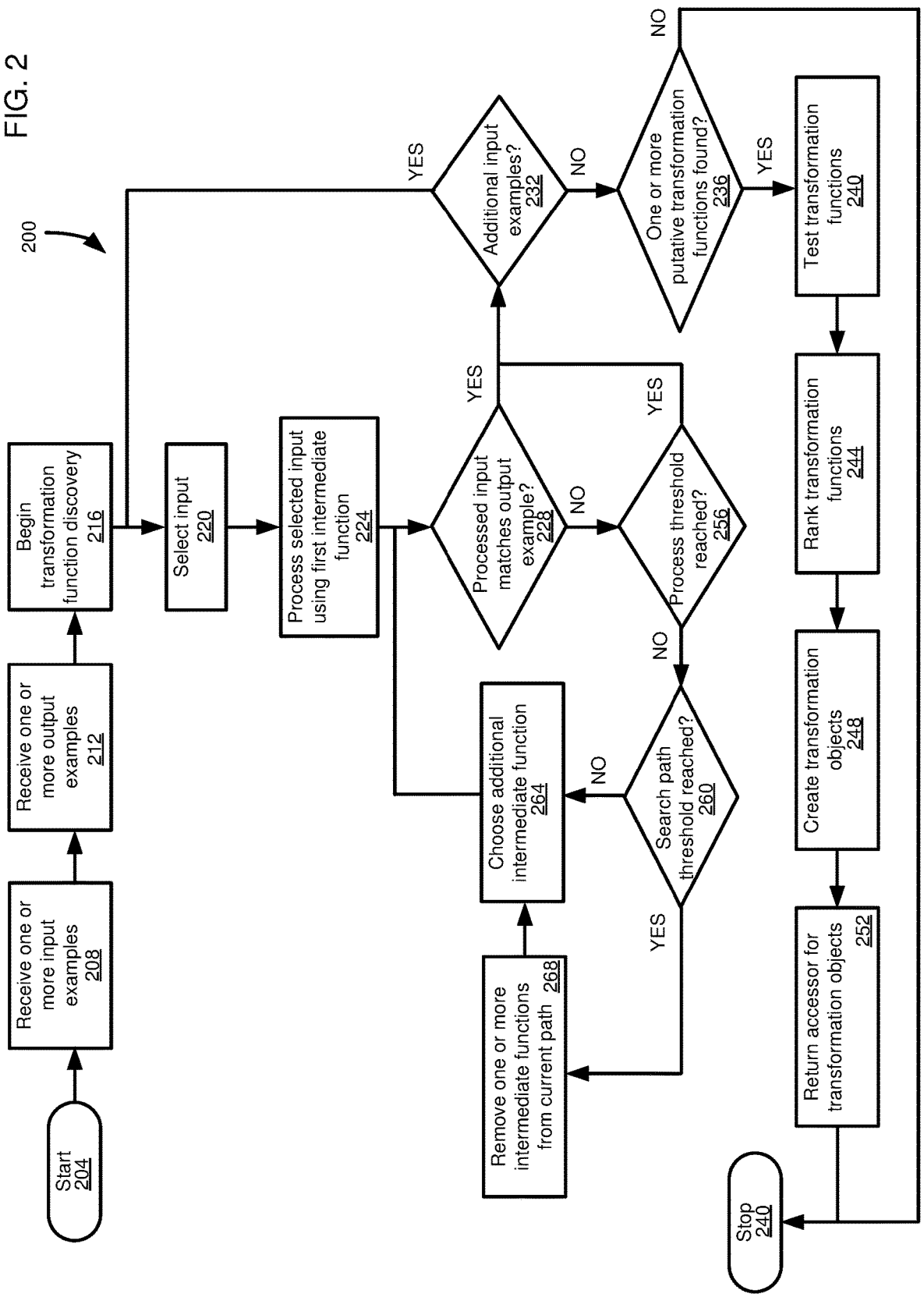
FIG. 2 is flowchart of a disclosed method for generating transformation objects.

FIG. 2 is a flowchart of a method 200, or algorithm, that can be used to create at least one transformation function from at least one input/output example. The method 200 begins at 204. At 208, one or more input examples are received, such as through user input, arguments provided in an API call, or through other means. At 212, one or more output examples are provided, such as through user input, arguments provided in an API call, or through other means. An input is correlated with its corresponding output, so that the method 200 can determine when one or more intermediate functions being evaluated for use in a transformation process convert the input example to the output example, or to a form that is acceptably close to the output example. The input examples received at 208 and the output examples received at 212 are typically associated as tuples, where one or more tuples can be received concurrently (e.g., 208 and 212 occur as a combined step for one or more tuples), or multiple tuples can be received sequentially (e.g., 208 and 212 can occur repeatedly, for each tuple received).

A transformation function discovery process begins at 216. At 220 a particular input example of the one or more input examples is selected for processing. The selected input example is processed with a first intermediate function at 224. An intermediate function can be, for example, an intermediate function as described in Example 1. Generally, intermediate functions can carry out character transformations based on characters in the input example, and, in at least some cases, based on characters in the output example.

Character transformations can include changing the capitalization of a character, converting a character of one character set to a character of another character set (for example, converting a Roman alphabetic character to a Cyrillic alphabet character), breaking a set of characters into multiple subsets, deleting one or more characters, or adding one or more characters. When output examples are used in the function discovery process, the function discovery process can include comparing the output example to the input example, and attempting to add characters present in the output example and not in the input example to the input example, or attempting to remove characters present in the input example and not in the output example.

At 228, the results of processing the input example, or an intermediate form of the input example (processed using one or more intermediate functions) is compared with its counterpart output example. If it is determined that the result matches the output example, the method 200 proceed to 232 to determine if additional input examples have been provided and are to be processed. If so, the method 200 can return to 220 to select the next input example (and its counterpart output example for the comparing at 228).

If, at 232, it was determined that no additional input examples are to be processed, it is determined at 236 whether one or more putative transformation functions have been identified. If not, the method 200 can end at 240. In ending at 240 as a result of failing to find a transformation function, a message or notification, such as an error message or error code, can be displayed.

If it is determined at 236 that one or more putative transformation functions have been found, one or more of such putative transformation functions can be tested at 240. Testing can include testing each putative transformation function against a set of one or more test input examples and comparing the output with corresponding test output examples. At 244, the putative transformation functions can be ranked, or filtered. Ranking or filtering can include ranking based on factors such as whether a putative transformation function provides expected output, or a degree of matching between its output and an expected output, a time taken to produce an output given an input (i.e., the processing time to accomplish a transformation), a number of intermediate functions used in the transformation function, other factors, or combinations of these factors.

Transformation objects can be created at 248 for one or more of the transformation functions ranked (or otherwise evaluated) at 244. Transformation objects can be instances of a class, program files (e.g., header and implementation files that can be compiled into, or called by, a program), script files (e.g., to call intermediate functions in a series determined by the transformation function discovery process), or another format such that the transformation function can be accessed by one or more computer programs. In particular, the transformation objects, and the transformation functions they provide, are available for programs being written by a developer. Accessors for the transformation functions objects can be returned (e.g., to a calling user or function) at 252. The accessor can be, for example, a name of a file or a name of a programmatic object (e.g., a logical pointer to the transformation object). In some cases, a transformation function can be called using the accessor and providing arguments expected by the transformation function/transformation object.

It should be appreciated that certain described steps of the method 200 can be optional, or carried out in a different order. For instance, one or both of testing transformation functions at 240 or ranking transformation functions at 244 can be omitted. In some cases, the creation of transformation objects at 248 can be carried out elsewhere in the method 200, such as prior to testing the transformation functions at 240 (for example, transformation functions can be incorporated into transformation objects, and the transformation objects can be used for the testing), or transformation objects can be used in carrying out the transformation function discovery process initiated at 216 (i.e., the discovery process is used to "build" or instantiate the transformation object, where a name, or accessor, for the transformation object may have already been created, such as being provided by a user).

Returning to the transformation function discovery process, if it is determined at 228 that the processed input does not match (or sufficiently match) the output example, the method 200 can proceed to 256. At 256, it can be determined whether a threshold for the transformation function discovery process, at least for a particular input example, has been reached. The threshold can be, in various examples: one or more of a number of iterations of the process (e.g., a number of times the checking of 228 was conducted); a running time; a number of backtracking steps attempted (as will be further described); or a failure to improve a matching value (e.g., a value that compares how closely the input example being processed, as processed, matches the output example). If the processing threshold has been reached, the method 200 can proceed to 232, and can continue as previously described. In some cases, the threshold evaluated at 256 can be for an entire transformation function discovery process, and the method can proceed to 236 (or 240, in some examples) without considering whether additional input examples are available.

If it is determined at 256 that the process threshold has not been reached, it can be determined at 260 whether a path threshold has been reached. That is, and as will be further described, the transformation function discovery process can add new intermediate functions to a series of intermediate functions that form a potential processing path to reach the example output from the example input. For a given transformation, a single intermediate function will often not be sufficient to transform the input example into the output example. This is particularly true when then intermediate functions are configured to incrementally alter the input example. The path processing threshold used at 260 can determine whether unused intermediate functions exist (although, in at least some cases, this is not used as a factor as, for example, a given intermediate function can generally be called/used multiple times in accomplishing a particular transformation, including using the same intermediate function multiple times in sequence or using the intermediate function multiple times, where one or more additional intermediate functions may be used between two uses of the given intermediate function). The path processing threshold used at 260 can use other or additional factors, such as a number of steps (i.e., intermediate functions) used in the path or a running time.

If it is determined at 260 that the path threshold has not been reached, an additional intermediate function can be chosen, at 264, to be added to the path and all or a portion of the input example processed using the additional intermediate function. The method 200 can then return to 228. If it is determined at 260 that the path threshold has been reached, at 268, one or more intermediate functions can be removed from the path, and then the method 200 can proceed to 264. The operations at 268 can be considered a backtracking event. In some cases, backtracking events can be tracked, such as using a counter, and used, for example, in determining at 256 whether a processing threshold has been reached.

Various changes can be made to the method 200. For example, rather than testing a single intermediate function at 224, multiple intermediate functions (in some cases, all of the intermediate functions in the rule base) can be tested, including for a given position in a path. At 228, determining whether the processed input matches the output example can include determining a degree of matching between the output of each of the intermediate functions applied at 224 and the output example. The degree of matching can be represented by a value, and the intermediate function that has a value that indicates a highest degree of matching with the output example (e.g., has the highest value, in some cases) can be selected to be added to the path. A matching value can take into account a variety of features, such as comparing the length of the processed input with the length of the output example and/or determining a number of characters that match between the processed input and the output example or a number of sequential characters (such as from the beginning of the processed input example and the beginning of the output example) that match. These factors can be weighted, if desired, in a calculation for determining a matching value.

In a similar manner, choosing an additional intermediate function at 264 can include choosing and testing multiple, including all, available intermediate functions, with the subsequent comparison at 228 being carried out as described in the preceding paragraph.

Example 4—Example Rule Base

FIG. 3 illustrates pseudocode 300 that provides an example of the types of intermediate functions that can be included in a rule base, such as the rule base 126 of FIG. 1, useable to develop transformation functions for at least some input/output examples. The pseudocode 300 includes operations 308 (shown as 308a-308c) for splitting an input set of characters into different components, where non-alphanumeric characters are used to split the input set (or a remainder subset after a portion of the subset has been removed/separated) in subsets. For example, in the example of "I.am.a.test.string" the operations 308 would result in subsets of "I" "am" "a" "test" "string". The operations 308 adds to a result string the word at a different position the array of words produced from the input example.

Pseudocode 300 includes a statement 312 that appends a space to the current result string. Other characters or collections of characters can be added to the set of characters being processed, or subsets thereof. In some cases, all or a portion of these characters can be determined from an output example. For instance, if this output example is "This is not a test string," both spaces and "not" could be determined to be needed to be added to words of the input example in order to produce the output example.

Operations 316 (shown as operations 316a-316d) are shown as converting different elements (character positions) of the result array to upper case characters. Other types of character manipulations can include changing all or part of a word to lower case characters, changing all or part of a word to upper case characters, or combinations thereof.

To illustrate how the pseudocode 300 can be used in finding a transformation function to reproduce an output example from a given input example, consider the input example of "weihao.lu@superinventor.com" and the output example of "Lu Weihao." A search algorithm, such as the method 200 of FIG. 2, can iteratively try various sequences of one or more intermediate functions until a composition of intermediate functions that produce the output example are found, or it is determined that no transformation function can be found, at least under the parameters provided for the search process (e.g., a running time or a maximum number of intermediate functions in a path). The search algorithm can determine that the output example can be produced from the input example by calling intermediate functions of the rule base (of the pseudocode 300) in the following sequence:

writeSecondWord( );
writeSpace( );
writeFirstWord( );
uppercaseFirstChar( );
UpperCaseFourthChar( );

Note that this transformation function reproduced the output example from the input example, but may not be sufficiently generalizable. That is, if the "goal" of the transformation function is to extract first and last names from an email address, and with appropriate capitalization, the transformation function provided above works for the input example, and for other inputs where a last name has only two characters. However, the transformation function might fail to work with input examples having a different number of characters in the last name. This issue can be addressed by having a greater variety of input and output examples, and by having additional intermediate functions in the rule base. In particular, if a greater number of examples were provided, a transformation function could be identified that produced more accurate results by capitalizing the first letter of words extracted from the input string ("globalInputExample"), or capitalizing the first element of any character subset added to the result string.

The above-described example illustrates that reproducing an output example typically involves not just determining the intermediate functions that are needed, but determining an order for how those intermediate functions should be applied to the input string (or character subsets derived therefrom). In addition to an ordering for a final sequence of intermediate functions, ordering can be used in prioritizing which intermediate functions should be attempted first in carrying out a transformation function discovery process. However, in other cases, an ordering is not used, such as randomly selecting a next intermediate function, or trying multiple, including all, intermediate functions at a given step of a path being developed.

Referring back to FIG. 2, choosing a first intermediate function at 224 or choosing an additional intermediate function 260 can involve selecting intermediate functions using a list or ordering. That is, it might be more efficient, for example, to split an input into subsets before manipulating characters (e.g., adding, removing, or changing the capitalization of characters) in the input string. The ordering or weighting of intermediate functions can, in some cases, be adjusted as transformation functions are identified. For example, the frequency that an intermediate function is used, and its position in a final series of intermediate functions that constitutes a transformation function (including its position relative to other types of intermediate functions) in newly identified transformation function can be used to adjust a weighting used for the intermediate function in the library.

Features present in an input example, or different between an input example and an output example can also be used in determining an order in which to try intermediate functions in a discovery process. For example, if an input example does not contain white spaces, or is not otherwise separated into discrete subsets, but an output example does, that may indicate that it may be useful to break the input character set into subsets prior to manipulating individual characters. On the other hand, if the output example differs from the input example by having inserted or appended characters, or by altered characters, it may be useful to try intermediate functions that add or alter characters before trying intermediate functions that break an input example into subsets.

In particular examples, machine learning techniques can be used in determining weightings or orderings for intermediate functions, for determining rules for sequencing intermediate functions (e.g., "try function 1," "is result better" "if yes, then try function 2," "if no, then try function 3"). Machine learning techniques can also be used, in particular implementations, to carry out the transformation function discovery process.

Example 5—Example Search Function

FIG. 4 illustrates example TypeScript source code 400 for a program that can manage a transformation function search using a rule base. Line 408 imports a rule base, "DynamicKnowledgeBase." Line 412 indicates that a search routine will execute a maximum of 100 times in trying to find a transformation function. The search program seeks to maximize a "gain," where a gain is a closeness between a possible output being evaluated and an output example. Line 414 sets a maximum threshold for the gain, such as to prevent the gain from exceeding the value that can be stored in the variable.

Line 418 indicates the beginning of a loop where the search function seeks to identify a transformation function. The loop continues to run as long as it continues to find improvement, the best gain is under the maximum set by line 414, the number of iterations of the loop is less than the limit set by line 412, and all output examples have not been matched using a putative transformation function. The loop adds each intermediate function in the rule base to the current path (e.g., collection of intermediate functions). For intermediate functions that improve matching between the output example and the calculated output, the intermediate function that produces the best improvement is added to the path, the loop continues, subject to the termination conditions of the loop.

Line 422 indicates the beginning of a scoring function that can be used to evaluate how closely an output at a current stage of processing for a current path matches a test output example. While other scoring functions can be used, one example scoring function converts the processing example and the test example to lower case (or upper case—generally, the comparison can be case-insensitive in some examples, while in other examples the scoring function can be adapted to be case-sensitive), and uses as a reference the portion of the output example corresponding to the length of the processing example.

As an example, consider an output example of "Hello World" and an intermediate result of "Hello". The example output has a length of 11 (including the space), and the intermediate result has a length of 5. The intermediate result matches the first five characters of the output example, and the length difference between the output example and the intermediate result is 6 (11−5). In an example, the matching score can be calculated as the length of the output example divided by the length difference (in this example, 11/6). If the lengths are equal, the score returned can be a maximum score (to avoid division by 0, among other things). If there is no match, a score, such as negative number, can be returned to indicate that there is no match/overlap between the intermediate result and the output example.

Figure 5A:
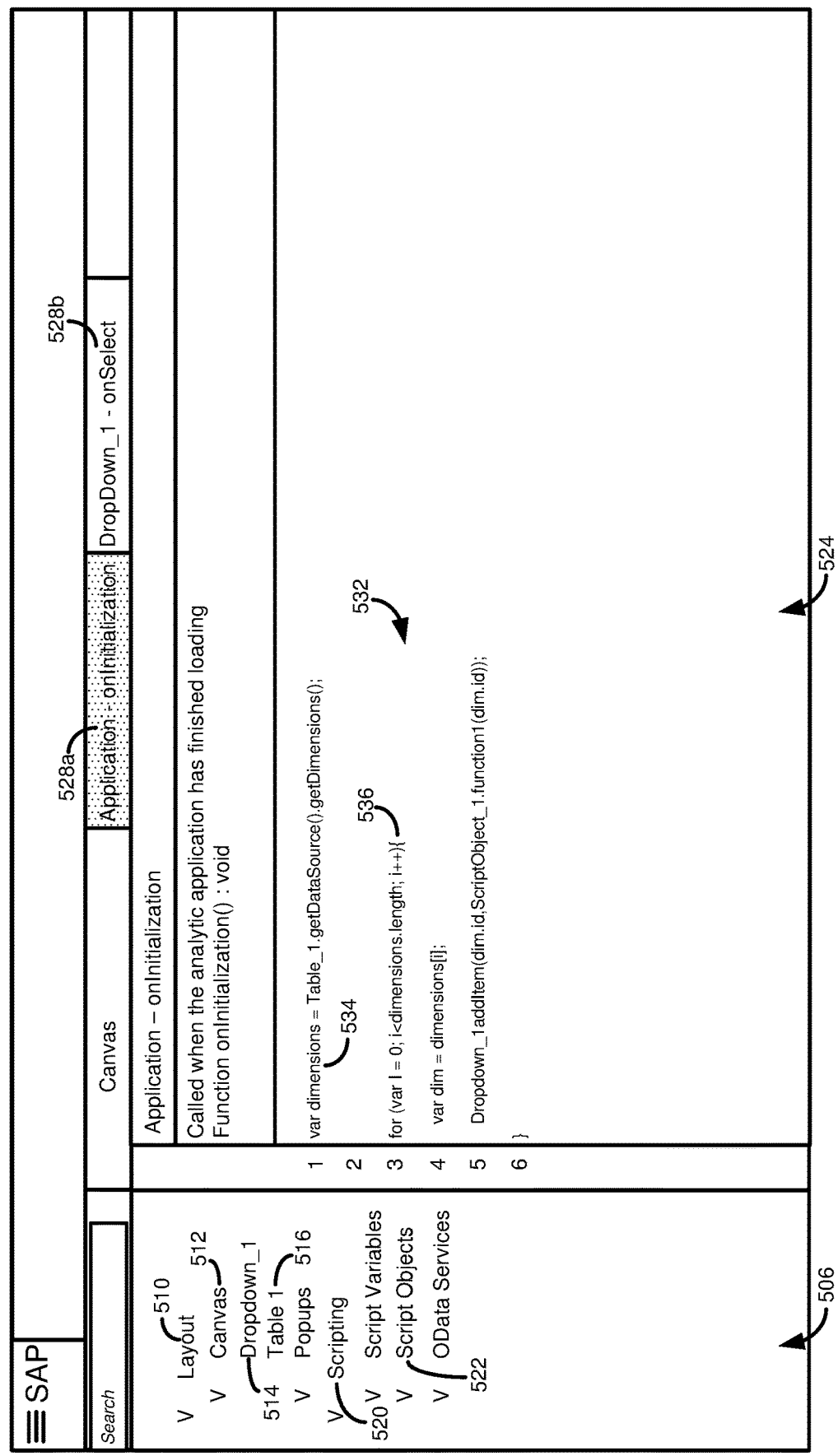
FIGS. 5A-5F are example screens that can be presented to a user in developing a program that uses transformation functions, and example displays that can be rendered by such a program.

Example 6—Example User Interface Screens for Finding and Using Transformation Objects FIGS. 5A-5F are example user interface screens illustrating how a user can incorporate disclosed technologies into a software development process. FIG. 5A illustrates a screen 500 that can be associated with a programming environment, such as an integrated development environment (IDE), or a program that provides at least some functionality typically associated with an IDE. The programming environment can be used, for example, to develop analytic applications, such as an application that can allow users to select, visualize, and interact with data. In particular, the user may choose to display a table with selected information from one or more base tables or an OLAP cube.

A navigation window 506 can allow a user to select various elements of a layout 510 for the program being developed, such as elements associated with a canvas 512 that will be provided by the application provided to end users. The canvas 512 is shown as being associated with a dropdown menu 514 and a table 516. Elements of the program, including elements of the canvas 512, can use various scripting elements 520, such as script objects 522.

A programming window 524 can allow a user to enter or edit code for various features of the program, including features associated with the layout 510 or the scripting elements 520. Multiple elements can be selected for editing in the programming window 524, and the user can navigate between the elements by selecting the appropriate tab 528 (shown as 528a, 528b) for the window. As shown, the user has selected a tab 528a for an "onInitialization" component, which can be a particular function or programming object. The "onInitialization" component can define actions that should be taken when the particular program being developed is started. In the illustrated example, when the program starts, the developer may wish to call a list of available elements, such as dimensions of an OLAP cube, and have those elements available for selection by an end user using the dropdown menu. The end user may then choose to retrieve data associated with particular, selected dimensions, and have the results presented in tabular form.

Accordingly, the tab 528a is associated with code 532 to be executed when the application is started. The code 532 includes operations 534 to obtain the dimensions in a given data source (e.g., an OLAP cube or a star or snowflake schema or other collection of one or more database tables). Operations 536 define a loop that adds the retrieved dimensions to a dropdown menu.

Figure 5B:
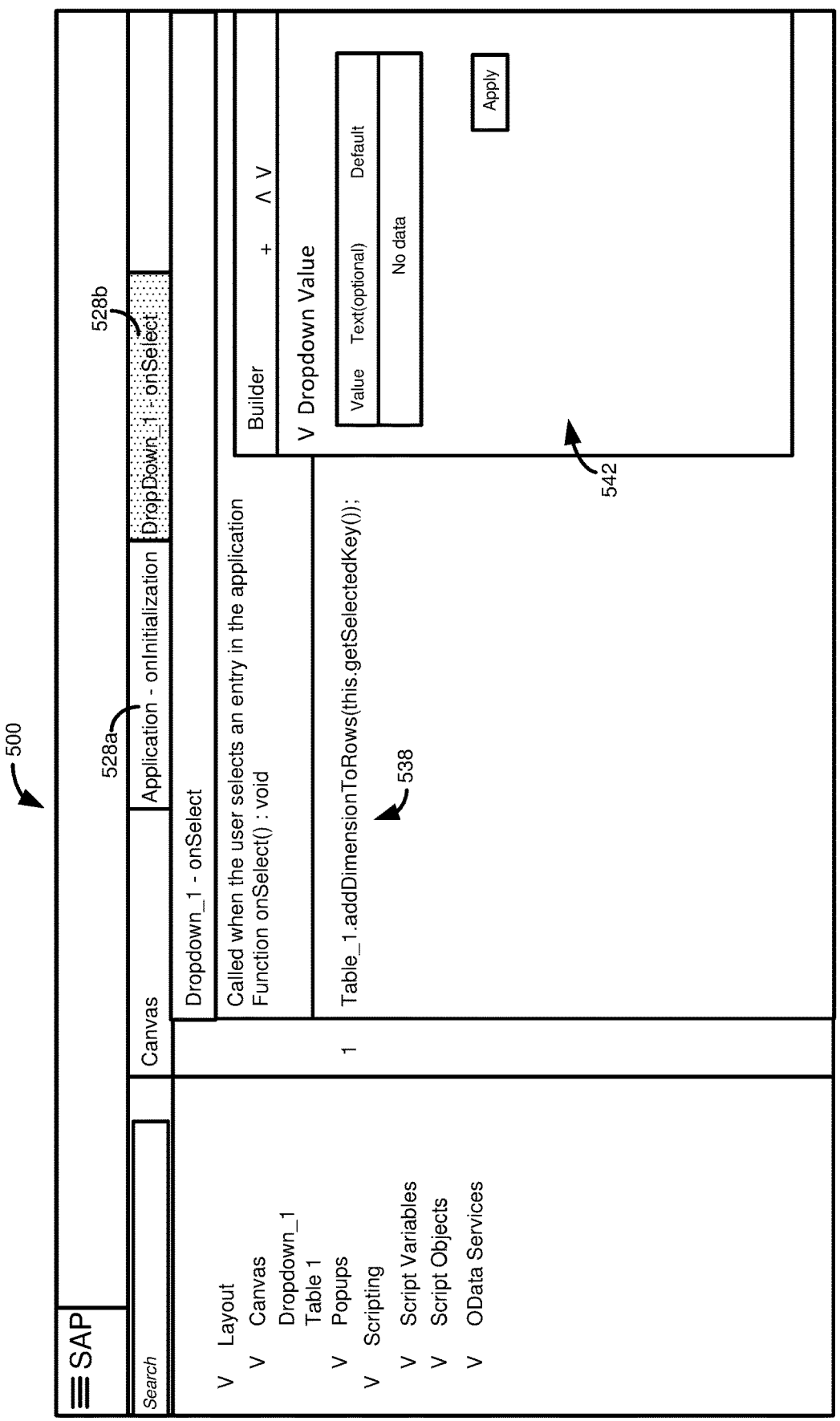

FIG. 5B illustrates the screen 500 after the user has selected the tab 528b for the "Dropdown_1" user interface control. The programming window 524 has changed to display code 538 associated with the dropdown menu. The code 538 is shown as causing a selected dimension to be added as a row to a table being defined. A preview of the dropdown menu is shown in window 542.

Figure 5C:
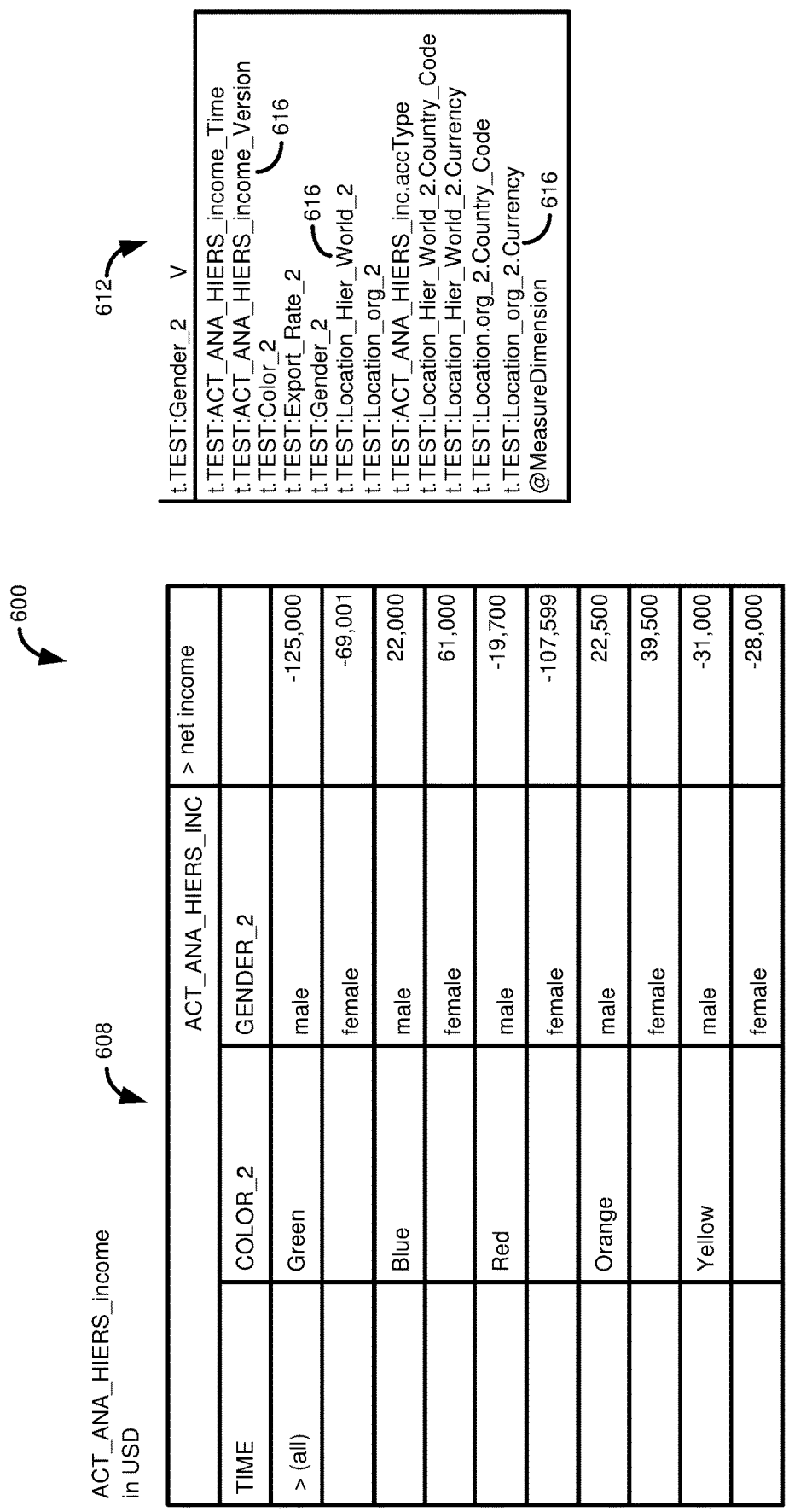

FIG. 5C illustrates a user interface screen 600 that displays the table 608 generated after execution of the code 532, execution of the code 538, and selection of several dimensions using a dropdown menu 612 (where selections in the dropdown menu are defined by the code 532 and results of selection using the dropdown menu are defined by the code 538). While the selected dimensions, as listed in the table 608, have names that appear as expected, identifiers 616 for the dimensions as included in the dropdown menu 612 include an artifact in the form of the prefix "t.TEST:". This prefix can represent, for example, an identifier for a table or other object or location of the dimension. While the dropdown menu 612 may be functional as implemented in FIGS. 5A and 5B, and as shown in FIG. 5C, the developer may be unsatisfied, as the dropdown menu may be more cumbersome, difficult for a user to understand, and generally have a less polished or professional look.

Typically, a developer would add code to the application, such as to the code 532, to reformat the dimension names prior to being displayed. In this example, the change might be fairly simple. However, it can be seen how as the number of changes that are needed becomes larger, the changes become more complex, and changes are used in other computing processes, that the work needed to make such formatting changes can greatly increase. The potential for erroneous code, and therefore erroneous data, can also increase.

Figure 5D:
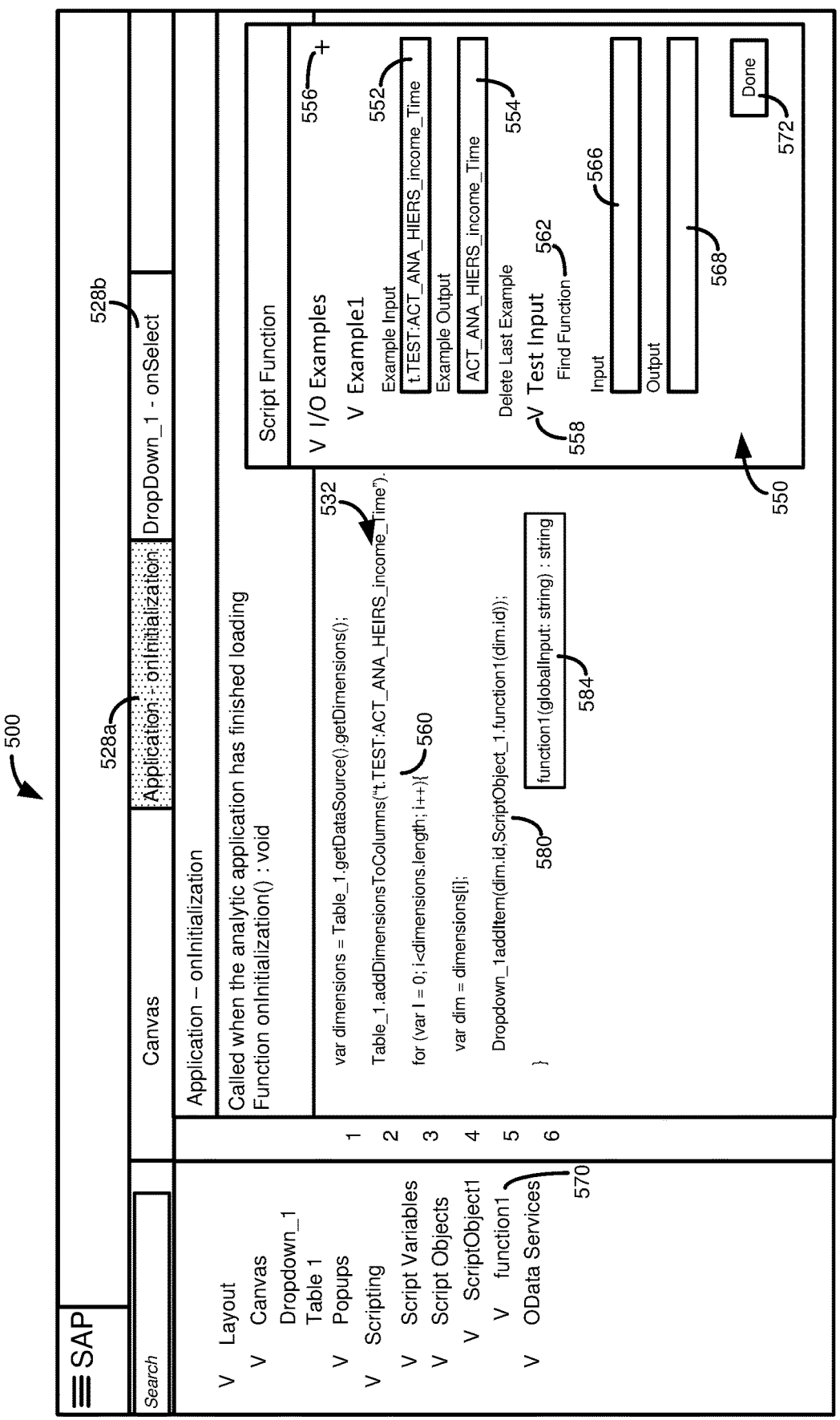

FIG. 5D illustrates the screen 500, with the tab 528a selected. In the navigation window 506, the function1 of ScriptObject 1 has been selected, bringing up a find transformation dialog window 550. The dialog window 550 includes a field 552 for entering an input example and a field 554 for entering an output example corresponding to that input example. A user may choose to add additional examples by selecting "add" user interface control 556, or to delete a prior example by selecting user interface control 558.

Code 532 has been shown with statement 560 added. Statement 560 can be used to generate text for an input example that can be copied and pasted into the field 552. That is, for example, an IDE associated with the screen 500 can suggest commands and other parameters to a user, including suggesting dimensions associated with a table identified in the code 532. The user can also copy and paste the text into the field 554, and edit the text to reflect the desired output.

Once the desired input/output examples have been provided, the user can start a process for finding a transformation function (e.g., the method 200 of FIG. 2) by selecting "find function" user interface control 562. In at least some cases, the user can be provided with a message indicating whether a function was successfully found.

Figure 5E:
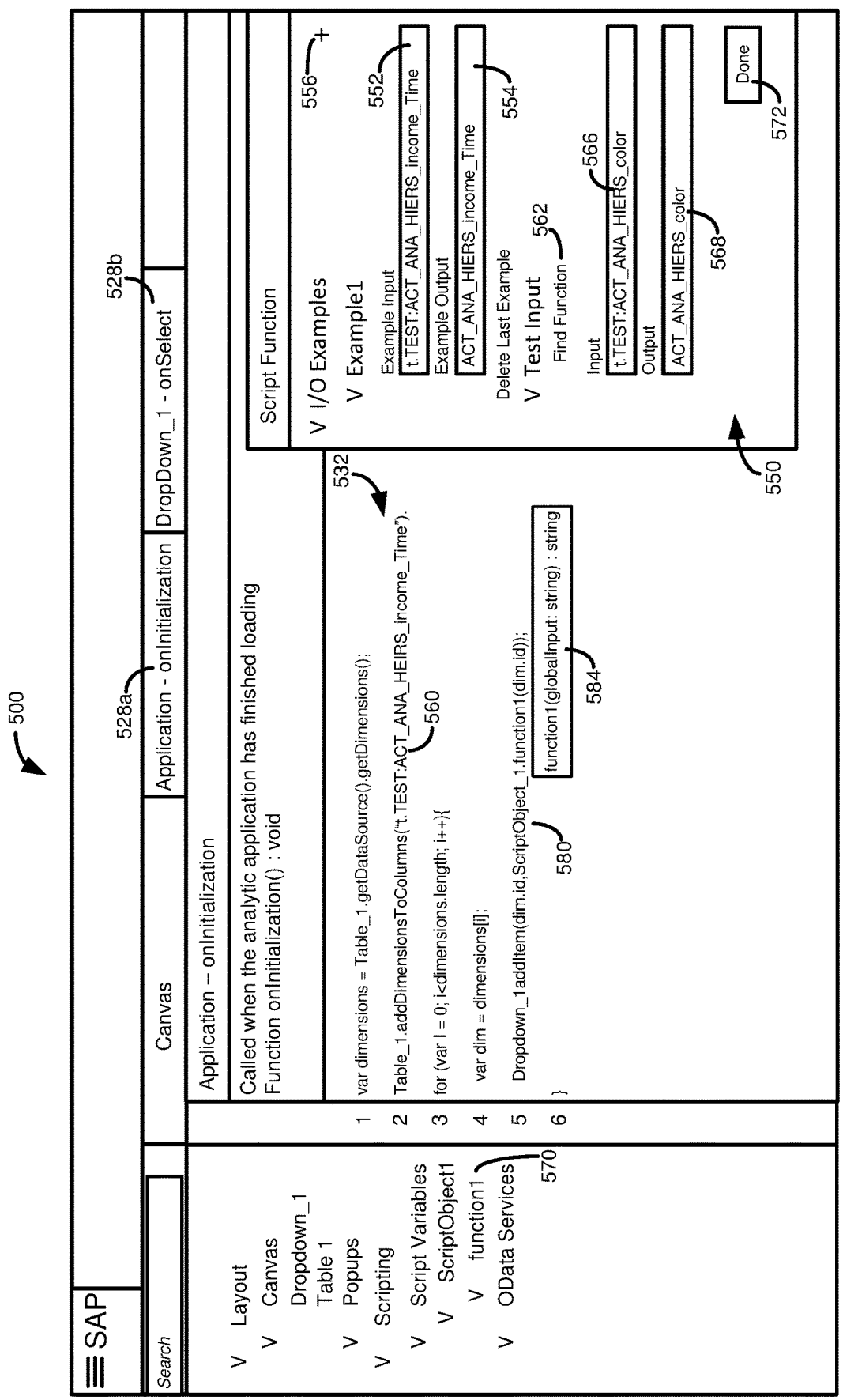

If a function was successfully found, the user can optionally choose to test the function by providing a test input example in field 566. Output determined using the identified transformation function is provided in a field 568. FIG. 5E illustrates the dialog window 550 with a test input example having been provided in field 566 and the output example generated displayed in field 568. The output appears as expected, providing some confidence that the transformation function is appropriate, at least with inputs that follow an expected pattern.

In some cases, selecting an icon 570 for function1 in the navigation window 506 can cause code associated with the function to be displayed. In other cases, selecting the icon 570 can cause the dialog window 550 to be displayed rather than, or in addition to, displaying code for the function. As an example of code that can provide a transformation function suitable for the illustrated example, code can be provided that breaks an input dimension name into a substring including the first seven characters of the input string and a remainder string, with the remainder string being provided as the dimension name to be displayed in the dropdown menu.

Once the user is satisfied that the transformation function is appropriate, or otherwise wishes the close the dialog window 550, the user can select a "done" user interface control 572. Statement 560 can be removed. Statement 580 of the code 532 is shown as modified compared with the code of FIG. 5A. In particular, the item to be added to the dropdown menu is not the dimension name as retrieved from the data source, but rather the value returned by function1 (the transformation function) in response to using that dimension name as an input. The IDE associated with the screen 500 can display a tooltip/popup text 584, which provides information regarding the arguments accepted by function1, and the value returned by function1. In the illustrated example, function1 accepts a string and also returns a string.

Figure 5F:
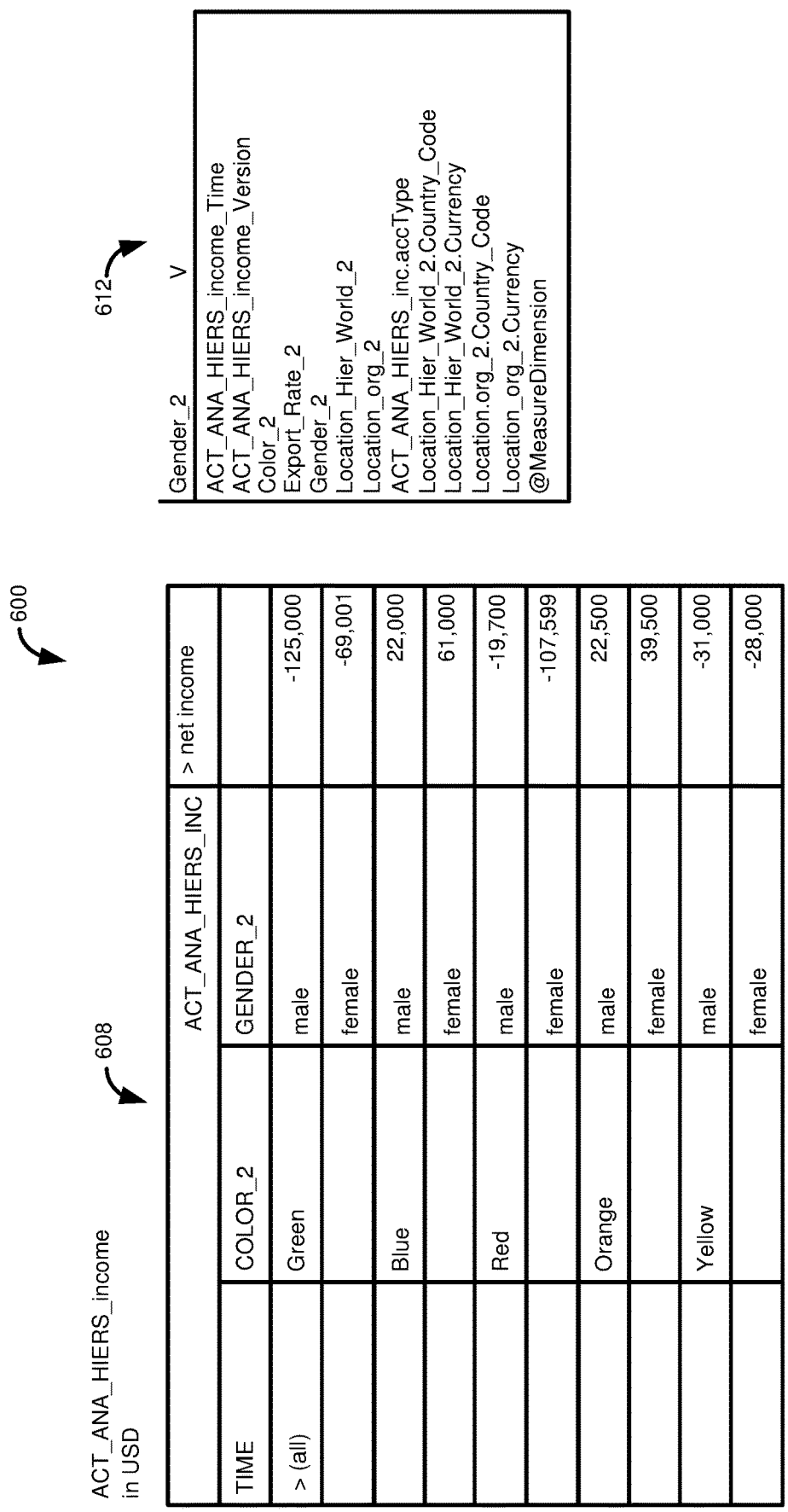

FIG. 5F illustrates the screen 600 produced using the modified code 528 of FIGS. 5D, 5E. While the table 608 is identical to the table as presented in FIG. 5C, the dropdown menu 612 illustrates the identifiers 616 as having the "t.TEST:" prefix remove, which is the desired result.

Example 7—Example Operations in Generating Transformation Objects

Figure 6A:
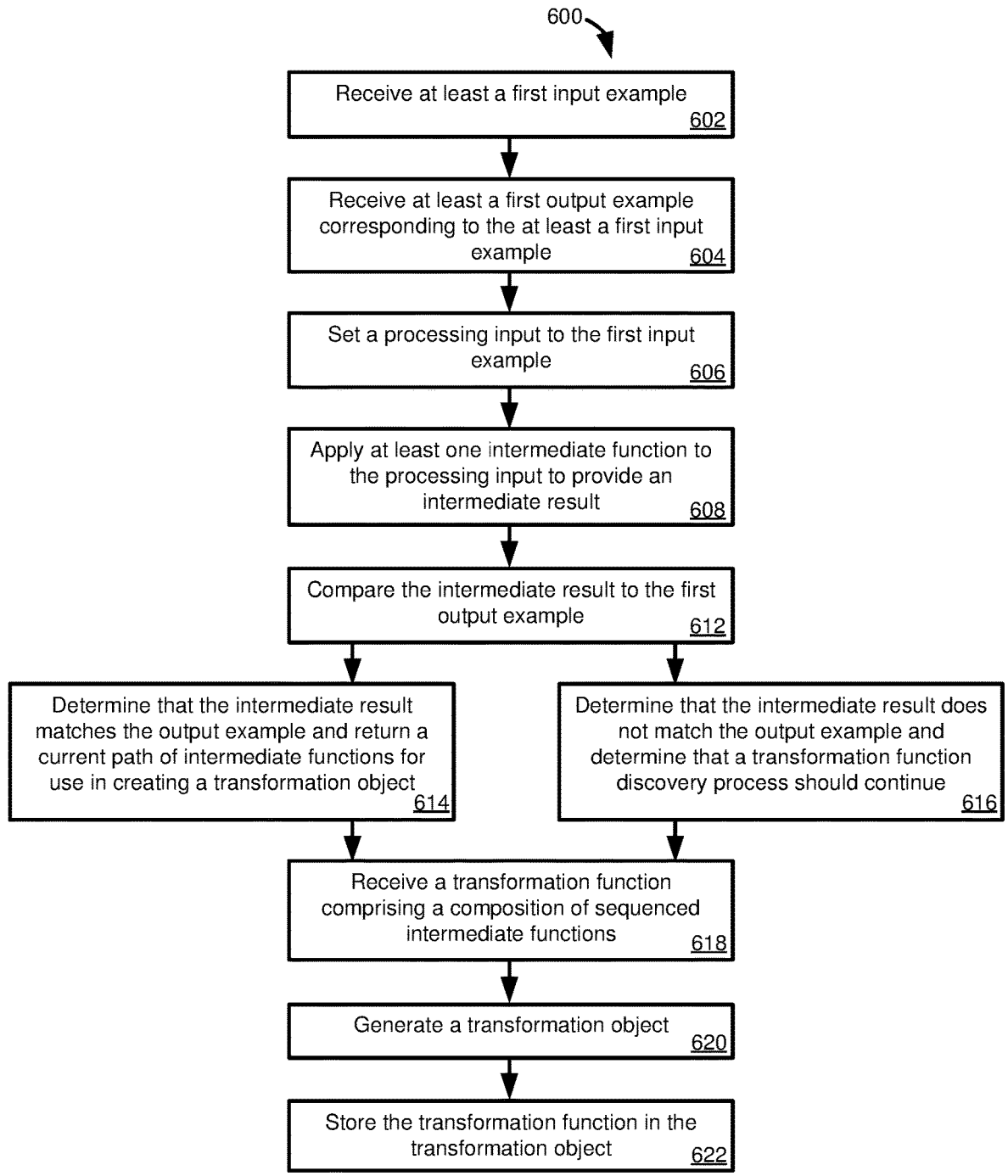

FIG. 6A illustrates a method 600 for generating transformation objects. The method 600 can be carried out, in some examples, using the computing environment 100 of FIG. 1, and can represent all or a portion of the operations in the method 200 of FIG. 2. At 602, at least a first input example is received. The at least a first input example includes a first set of a first plurality of sequential characters. At least a first output example is received at 604. The at least a first output example corresponds to the at least a first input example and includes a second set of a second plurality of sequential characters. At 606, a processing input is set to the first input example.

A transformation function discovery process is initiated. At least one intermediate function is applied, at 608, to the processing input to provide an intermediate result. At 612, the intermediate result is compared with the first output example. It is determined at 614 that the intermediate result matches the output example, in which case a current path of intermediate functions is returned for use in creating a transformation object. Or, it is determined at 616 that the intermediate result does not match the output example, in which case it is determined that the transformation function discovery process should continue.

At 618, a transformation function is received. The transformation function includes a composition of sequenced intermediate functions. At 620, a transformation object is generated. In some cases, the generating can occur prior to, or currently with, receiving a transformation function at 618, while in other cases the generating can occur after the receiving. The transformation function is stored in the transformation object at 622 (e.g., code implementing the transformation function is stored, or references to code that can be used to carry out transformation operations are stored). The transformation object is referenceable by computing code to process at least one input provided by the computing code to provide a transformed output in response.

FIG. 6B illustrates a method 630 for generating transformation objects. The method 630 can be carried out, in some examples, using the computing environment 100 of FIG. 1, and can represent all or a portion of the operations in the method 200 of FIG. 2. At 632, a display is rendered for receiving user input from a user. The user input provides one or more input examples and one or more output examples corresponding to the one or more input examples. The one or more input examples and the one or more output examples include respective sets of a plurality of characters.

At least one transformation function is identified, at 634, that converts at least one of the one or more input examples into its corresponding output example. At 636, a transformation object (e.g., a function, such as in a file, or an instance of a class) is generated that is useable to access the at least one transformation function. Source code is received at 638 that calls the transformation object to convert an input set of a plurality of characters to an output set of a plurality of characters.

FIG. 6C illustrates a method 650 for generating transformation objects. The method 650 can be carried out, in some examples, using the computing environment 100 of FIG. 1, and can represent all or a portion of the operations in the method 200 of FIG. 2. At 652, one or more input examples and one or more output examples, corresponding to the one or more input examples, are received. The one or more input examples and the one or more output examples include respective sets of a plurality of sequenced characters.

A request is received at 654 to generate a transformation object. At 656, at least one transformation function is identified that converts at least one of the one or more input examples to its corresponding output example. The at least one transformation function includes or calls a plurality of intermediate functions. A transformation object useable to access the at least one transformation function is generated at 658. At 660, an accessor for the transformation object is provided.

Example 8—Computing Systems

Figure 7:
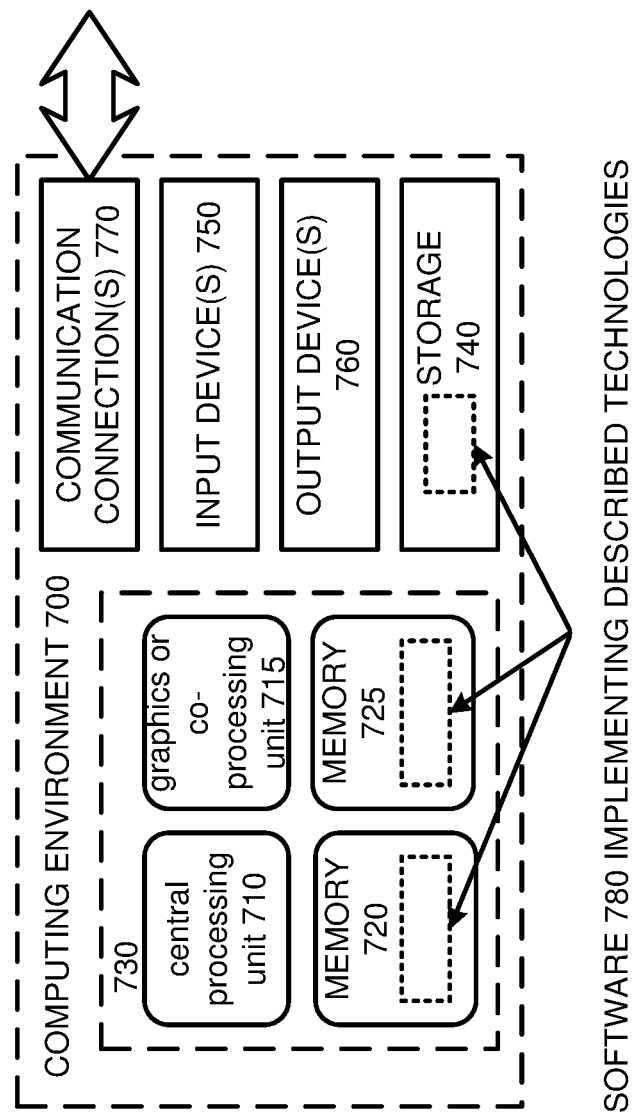
FIG. 7 is a diagram of an example computing system in which some described embodiments can be implemented.

FIG. 7 depicts a generalized example of a suitable computing system 700 in which the described innovations may be implemented. The computing system 700 is not intended to suggest any limitation as to scope of use or functionality of the present disclosure, as the innovations may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing technologies describes in Examples 1-7. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715. The memory 720, 725, may also store database data.

A computing system 700 may have additional features. For example, the computing system 700 includes storage 740, one or more input devices 750, one or more output devices 760, and one or more communication connections 770, including input devices, output devices, and communication connections for interacting with a user, such as through the user interface screens 500, 600 of FIGS. 5A-5F. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are highlevel abstractions for operations performed by a computer, and should not be confused with acts performed by a human being. The actual computer operations corresponding to these terms vary depending on implementation.

Example 9—Cloud Computing Environment

Figure 8:
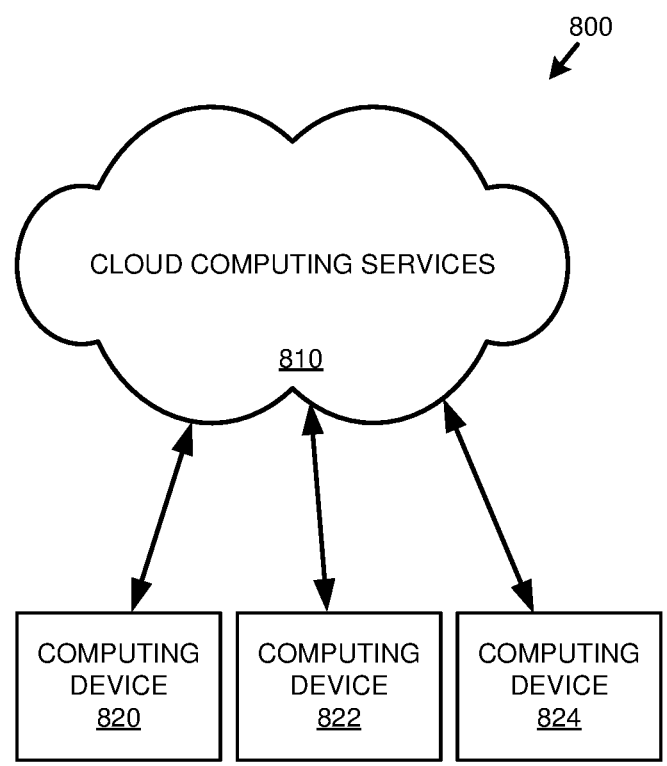
FIG. 8 is an example cloud computing environment that can be used in conjunction with the technologies described herein.

FIG. 8 depicts an example cloud computing environment 800 in which the described technologies can be implemented. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For example, the computing devices (e.g., 820, 822, and 824) can be computers (e.g., desktop or laptop computers), mobile devices (e.g., tablet computers or smart phones), or other types of computing devices. For example, the computing devices (e.g., 820, 822, and 824) can utilize the cloud computing services 810 to perform computing operations (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more processing units coupled to the at least one memory; and
   one or more tangible computer readable storage media storing instructions that, when loaded into the at least one memory, cause the one or more processing units to perform operations for:
      receiving at least a first input example comprising a first set comprising a first plurality of sequential characters;
      receiving at least a first output example corresponding to the first input example and comprising a second set comprising a second plurality of sequential characters;
      setting a processing input to the first input example;

executing a transformation function discovery process comprising:
sequentially applying intermediate functions in a current path of intermediate functions, the current path comprising one or more intermediate functions or being empty, and a first intermediate function to the processing input to provide a first intermediate result;
comparing the first intermediate result with the first output example;
determining that
the first intermediate result does not match the output example and that the transformation discovery process should continue;
adding the first intermediate function to the current path;
after determining that the first intermediate results does not match the output example, sequentially applying intermediate functions in the current path, the current path comprising the first intermediate function, and a second intermediate function to the processing input to provide a second intermediate result;
comparing the second intermediate result with the first output example;
determining that the second intermediate result matches the first output example;
adding the second intermediate function to the current path;
after adding the second intermediate function to the current path, returning a path comprising the current path for use in creating a transformation object;
receiving a transformation function, the transformation function comprising a composition of sequenced intermediate functions determined from the path;
generating a transformation object; and
storing the transformation function in the transformation object, the transformation object being referenceable by computing code to process at least one input provided by the computing code to provide a transformed output in response.

2. The computing system of claim 1, wherein the transformation function comprises source code implementing the sequenced intermediate functions.

3. The computing system of claim 1, wherein the transformation function comprises source code calling intermediate functions in the composition.

4. The computing system of claim 1, the transformation function discovery process further comprising:
selecting the at least one intermediate function from a rule base comprising a plurality of intermediate functions.

5. The computing system of claim 1, the transformation function discovery process further comprising:
applying the intermediate functions in the current path and a third intermediate function to the processing input;
determining whether the third intermediate function improved a score reflecting how closely the intermediate result and the output example match.

6. The computing system of claim 5, the transformation function discovery process further comprising:
in response to determining that the third intermediate function improved the score, adding the third intermediate function to the current path.

7. The computing system of claim 5, the transformation function discovery process further comprising:
in response to determining that the third intermediate function did not improve the score, not adding the third intermediate function to the current path.

8. The computing system of claim 5, wherein the current path is a first version of the current path, the transformation function discovery process further comprising:
in response to determining that the third intermediate result does not match the output example:
determining whether a threshold number of intermediate functions have been added to the first version of the current path;
removing one or more intermediate functions from the first version of the current path to provide a second version of the current path; and
selecting as a next intermediate function to be added to the second version of the current path an intermediate function other than an intermediate function at an earliest sequence position in one or more intermediate functions removed from the first version of the current path.

9. The computing system of claim 1, wherein the current path is a first current path and the transformation discovery process is a first transformation discovery process, the operations further comprising:
adding the transformation as an intermediate function to a rule base comprising a plurality of intermediate functions;
in a second transformation discovery process for at least a second input example, carried out after the first transformation discovery process, adding the transformation from the rule base to a second current path of one or more intermediate functions being evaluated for converting the second input example to a second output example.

10. The computing system of claim 1, the transformation function discovery process further comprising:
determining a number of times intermediate functions in the current path have been applied to the processing input;
determining whether the number of times satisfies a threshold number of times; and
in response to determining that the number of times satisfied the threshold number of times, terminating the transformation function discovery process.

11. The computing system of claim 1, the operations further comprising:
returning an accessor for the transformation object.

12. The computing system of claim 11, wherein the accessor comprises an identifier of a function that can be called to execute the transformation function.

13. The computing system of claim 11, wherein the accessor comprises an identifier of an instance of a class.

14. The computing system of claim 1, the operations further comprising:
displaying a transformation object generation user interface control;
receiving first user input through a graphical user interface selecting the transformation object generation user interface control;
displaying an input example field in the graphical user interface, wherein the at least a first input example is received through the input example field;
displaying an output example field in the graphical user interface, wherein the at least a first output example is received through the output example field;
displaying an identifier of the transformation object in the graphical user interface; and receiving second user input through the graphical user interface, the second user input comprising computer code calling the transformation object.

15. The computing system of claim 1, the operations further comprising:
rendering a display comprising a first field for receiving first user input providing a test input example;
processing the test input example using the transformation function to provide a test output example; and
displaying the test output example.

16. The computing system of claim 1, wherein the transformation function discovery process is a first transformation discovery process and the transformation function is a first transformation function, the operations further comprising:
receiving at least a second input example and at least a second output example corresponding to the at least a second input example;
executing a second transformation discovery process, the second transformation discovery process comprising operations of the first transformation discovery processed carried out using the second input example and the second output example in place of the first input example and the first output example, wherein the second transformation discovery process seeks to determine a second transformation function that can produce the at least a first output example from the at least a first input example and can produce the at least a second output example from the at least a second input example.

17. The computing system of claim 1, wherein the transformation function discovery process identifies a plurality of transformation functions, the operations further comprising:
ranking transformation functions of the plurality of transformation functions.

18. One or more tangible computer-readable storage media storing computer-executable instructions for causing a computing system to perform operations comprising:
receiving at least a first input example comprising a first set comprising a first plurality of sequential characters;
receiving at least a first output example corresponding to the first input example and comprising a second set comprising a second plurality of sequential characters;
setting a processing input to the first input example;
executing a transformation function discovery process comprising:
sequentially applying intermediate functions in a current path of intermediate functions, the current path comprising one or more intermediate functions or being empty, and a first intermediate function to the processing input to provide a first intermediate result;
comparing the first intermediate result with the first output example;
determining that the first intermediate result does not match the output example and that the transformation discovery process should continue;
adding the first intermediate function to the current path;
after determining that the first intermediate results does not match the output example, sequentially applying intermediate functions in the current path, the current path comprising the first intermediate function, and a second intermediate function to the processing input to provide a second intermediate result;
comparing the second intermediate result with the first output example;
determining that the second intermediate result matches the first output example;
adding the second intermediate function to the current path;
after adding the second intermediate function to the current path, returning a path comprising the current path for use in creating a transformation object;
receiving a transformation function, the transformation function comprising a composition of sequenced intermediate functions determined from the path;
generating a transformation object; and
storing the transformation function in the transformation object, the transformation object being referenceable by computing code to process at least one input provided by the computing code to provide a transformed output in response.

19. A method, implemented by a computing device comprising at least one memory and at least one processor coupled to the at least one memory, comprising:
receiving at least a first input example comprising a first set comprising a first plurality of sequential characters;
receiving at least a first output example corresponding to the first input example and comprising a second set comprising a second plurality of sequential characters;
setting a processing input to the first input example;
executing a transformation function discovery process comprising:
sequentially applying intermediate functions in a current path of intermediate functions, the current path comprising one or more intermediate functions or being empty, and a first intermediate function to the processing input to provide a first intermediate result;
comparing the first intermediate result with the first output example;
determining that the first intermediate result does not match the output example and that the transformation discovery process should continue;
adding the first intermediate function to the current path;
after determining that the first intermediate results does not match the output example, sequentially applying intermediate functions in the current path, the current path comprising the first intermediate function, and a second intermediate function to the processing input to provide a second intermediate result;
comparing the second intermediate result with the first output example;
determining that the second intermediate result matches the first output example;
adding the second intermediate function to the current path;
after adding the second intermediate function to the current path, returning a path comprising the current path for use in creating a transformation object;
receiving a transformation function, the transformation function comprising a composition of sequenced intermediate functions determined from the path;
generating a transformation object; and
storing the transformation function in the transformation object, the transformation object being referenceable by computing code to process at least one input provided by the computing code to provide a transformed output in response.

20. The computing system of claim 1, wherein the first intermediate function is added to the current path prior to the providing the first intermediate result.

* * * * *